United States Patent
Zhao

(10) Patent No.: US 8,527,565 B2
(45) Date of Patent: Sep. 3, 2013

(54) SELECTING AND REASSIGNING A BLADE FOR A LOGICAL PARTITION FOR SERVICE SCHEDULING OF A BLADE SERVER

(75) Inventor: Shouzhong Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 13/248,620

(22) Filed: Sep. 29, 2011

(65) Prior Publication Data

US 2012/0066689 A1 Mar. 15, 2012

Related U.S. Application Data

(63) Continuation of application No. PCT/CN2010/070928, filed on Mar. 9, 2010.

(30) Foreign Application Priority Data

Mar. 30, 2009 (CN) .......................... 2009 1 0132344

(51) Int. Cl.
*G06F 9/46* (2006.01)
(52) U.S. Cl.
USPC ......................................................... 708/105
(58) Field of Classification Search
None
See application file for complete search history.

(56) References Cited

U.S. PATENT DOCUMENTS

| 6,848,034 | B2 | 1/2005 | Cohn et al. | |
|---|---|---|---|---|
| 2002/0032835 | A1* | 3/2002 | Li et al. | 711/114 |
| 2003/0191908 | A1 | 10/2003 | Cohn et al. | |
| 2004/0054780 | A1* | 3/2004 | Romero | 709/226 |
| 2004/0199568 | A1 | 10/2004 | Lund | |
| 2006/0190484 | A1* | 8/2006 | Cromer et al. | 707/104.1 |
| 2008/0028107 | A1* | 1/2008 | Cherian et al. | 710/9 |
| 2009/0164660 | A1* | 6/2009 | Abrams | 709/236 |

FOREIGN PATENT DOCUMENTS

| CN | 1821967 A | 8/2006 |
|---|---|---|
| CN | 2852260 Y | 12/2006 |
| CN | 101150413 A | 3/2008 |
| CN | 101178634 A | 5/2008 |
| CN | 101222362 A | 7/2008 |

OTHER PUBLICATIONS

International Search Report from the Chinese Patent Office for International Application No. PCT/CN2010/070928 mailed Jun. 17, 2010.
Written Opinion of the International Searching Authority in International Application No. PCT/CN2010/070928 mailed Jun. 17, 2010.

* cited by examiner

*Primary Examiner* — Meng An
*Assistant Examiner* — James J Lee
(74) *Attorney, Agent, or Firm* — Conley Rose, P.C.; Grant Rodolph; Nicholas K. Beaulieu

(57) ABSTRACT

The present invention discloses a blade server and a service scheduling method of the blade server. The method includes the following steps. According to the requirement for processing capability of a service, a blade is selected for a logical partition storing the service data (A1); an identifier of the logical partition storing the service data is issued to the selected blade (A2); the blade starts the service from the logical partition corresponding to the identifier of the logical partition (A3), realizing the dynamic distribution of blades according to the service requirement, and enabling a high-performance blade to be selected at the peaks of the service, so as to ensure that the service is processed normally; while at the valleys of the service, a blade having relatively low performance is used to release the high-performance blade for processing other services.

18 Claims, 3 Drawing Sheets ively low performance is used to release the high-performance blade for processing other services. Compared with the static configuration method between the blade and the service in the related art, the present invention can make a more effective use of the blade resources and reduce the cost of the blade server.

SELECTING AND REASSIGNING A BLADE FOR A LOGICAL PARTITION FOR SERVICE SCHEDULING OF A BLADE SERVER

CROSS-REFERENCE TO RELATED APPLICATIONS

This application is a continuation in part of International Application No. PCT/CN2010/070928, filed on Mar. 9, 2010, which claims priority to Chinese Patent Application No. 200910132344.7, filed on Mar. 30, 2009, both of which are hereby incorporated by reference in their entireties.

FIELD OF THE INVENTION

The present invention relates to the field of communications technologies, and in particular, to a blade server and a service scheduling method of the blade server.

BACKGROUND OF THE INVENTION

A blade server is a High Availability High Density (HAHD) server platform, and is specially designed for high density computer environments, where each piece of blade is actually a system motherboard and is similar to an independent server that serves specified different user groups. After these motherboards are integrated into a server cluster by using system software, resources can be shared.

A blade server is provided by the related art 1, and FIG. 1 is a schematic structural diagram of the blade server. Generally, the blade server is formed of components, such as a frame management plate, a blade, a switchboard, a power supply, and a fan.

A blade is installed with a storage, which stores resources such as service data of a service provided by the blade and an operating system run on the blade, and in this method, computing resources (a CPU and a memory) and storage resources (hard disks) are all integrated in a blade of a blade server. After a blade is replaced, because the blade is a bare board, it is required to reinstall the services (reinstall the operating system and service package) and perform the recovery of related service data. The foregoing process takes a long time (at least 50 minutes), and easily leads to data recovery failure.

Another blade server is provided by the related art 2, the difference between the structure of the blade server and that of the blade server in the related art 1 is that storage resources are separated from computing resources, that is to say blades are not started from the local hard disk, but a centralized storage area is installed to provide data storage for all the blades. Technicians set on a blade a partition from which of the storage area the blade will be started, so that when replacing a blade or making expansion, it is not required to reinstall the operating system and service data, and it is only required to set that the new blade starts from the original partition.

In the study and implementation of the related art, the inventor finds that the related art 2 can solve problems about replacing a blade or making expansion in the related art 1, but in the related art 2, the corresponding relation between a blade and a storage partition is preset fixedly, and once technicians finish the setting, the system cannot change the corresponding relation automatically. During the process of service processing in blades, due to the differences of blades and the dynamics of services, it often happens that services for processing increase suddenly in some blades, occupy too many resources, and fail to be processed normally, at the same time, other blades are approximately in an idle state due to a small amount of services for processing, resulting in a waste of resources.

SUMMARY OF THE INVENTION

Embodiments of the present invention provide a blade server and a service scheduling method of the blade server to make a better use of the blade server resource.

A service scheduling method of a blade server provided in an embodiment of the present invention includes: selecting a blade for a logical partition storing service data according to the requirement for processing capability of a service; issuing an identifier of the logical partition storing the service data to the selected blade; and enabling the blade to start the service from the logical partition corresponding to the identifier of the logical partition.

A blade server provided in an embodiment of the present invention includes at least two blades and a storage, where the storage includes at least two logical partitions, and the blade server further includes:

a configuration management unit, configured to select a blade for a logical partition storing service data according to the requirement for processing capability of a service; and issue an identifier of the logical partition storing the service data to the selected blade; and the blade is further configured to receive the identifier of the logical partition issued by the configuration management unit, and start the service from the logical partition corresponding to the identifier of the logical partition.

In the embodiments of the present invention, according to the requirement for processing capability of a service, a blade is selected for a logical partition storing the service data; an identifier of the logical partition storing the service data is issued to the selected blade; the blade starts the service from the logical partition corresponding to the identifier of the logical partition, thereby realizing dynamic distribution of blades according to service requirement, so that a high-performance blade is selected at the peaks of the service, which ensures that the service is processed normally; while at the valleys of the service, a blade having a relatively low performance is used to release the high-performance blade for processing other services. Compared with the static configuration method between the blade and the service in the related art, the present invention can make a more effective use of the blade resources and reduce the cost of the blade server.

DETAILED DESCRIPTION OF THE EMBODIMENTS

The technical solutions of the embodiments of the present invention are clearly and completely described in the following with reference to the accompanying drawings in the embodiments of the present invention. Apparently, the embodiments in the following descriptions are merely a part of the embodiments of the present invention, rather than all the embodiments of the present invention. Persons skilled in the art can derive other embodiments based on the embodiments of the present invention without creative efforts, which all fall within the protection scope of the present invention.

Embodiments of the present invention provide a service scheduling method, and the embodiments of the present invention further provide a corresponding blade server. The service scheduling method and the blade server are respectively described in detail in the following.

Figure 2:
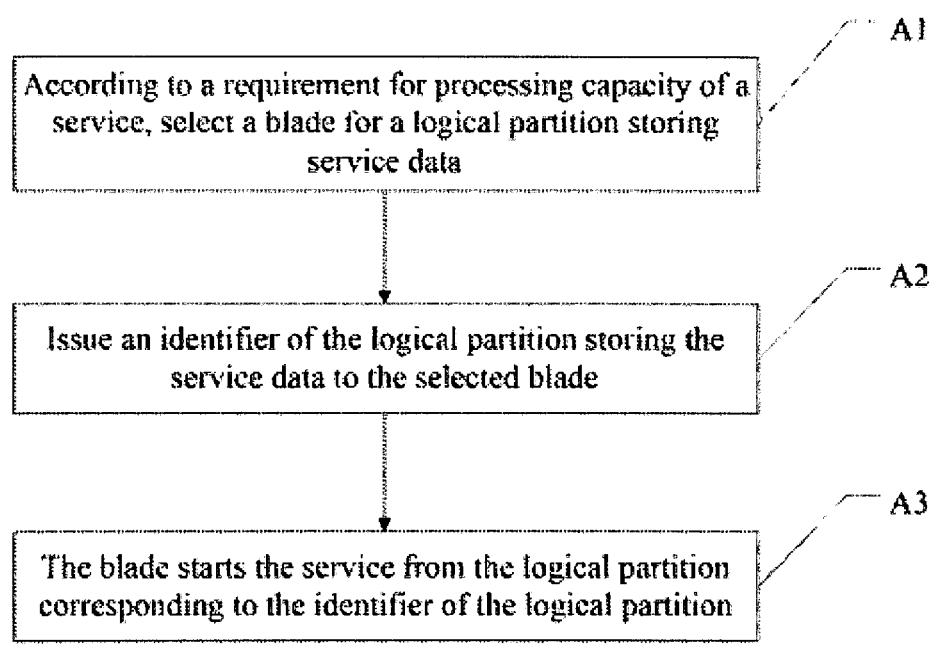
FIG. 2 is a flow chart of a service scheduling method according to Embodiment 1 of the present invention.

A service scheduling method is provided, and the flow chart of the service scheduling method is as shown in FIG. 2, which includes the following steps.

Step A1: Select a blade for a logical partition storing service data according to a requirement for processing capability of a service. The requirement for processing capability of the service may be set manually in advance, and may also be obtained by collecting automatic statistics about the service data.

The automatic statistics of the system may be: counting the number of access users and the traffic of data transmission, and comparing the statistical data with a standard value to reflect the requirement for blade processing capability of a service.

Step A2: Issue an identifier of the logical partition storing the service data to the selected blade.

According to an embodiment of the present invention, an identifier of a logical partition may be a volume label of the logical partition or other identifiers for identifying a storage partition, such as a logical unit number (LUN), disk array number, and hard disk interface number, this embodiment only emphasizes that the identifier of an logical partition can uniquely identify the logical partition in the system, and specific forms of the identifier do not constitute a limitation to the present invention.

Step A3: The blade starts the service from the logical partition corresponding to the identifier of the logical partition.

In Embodiment 1 of the present invention, according to a requirement for processing capability of a service, a blade is selected for the logical partition storing the service data; an identifier of the logical partition storing the service data is issued to the selected blade; the blade starts the service from the logical partition corresponding to the identifier of the logical partition, realizing distribution of the blades according to the service requirement, so that the present invention can make a more effective use of the blade resources and reduce the cost of the blade server.

Figure 1:
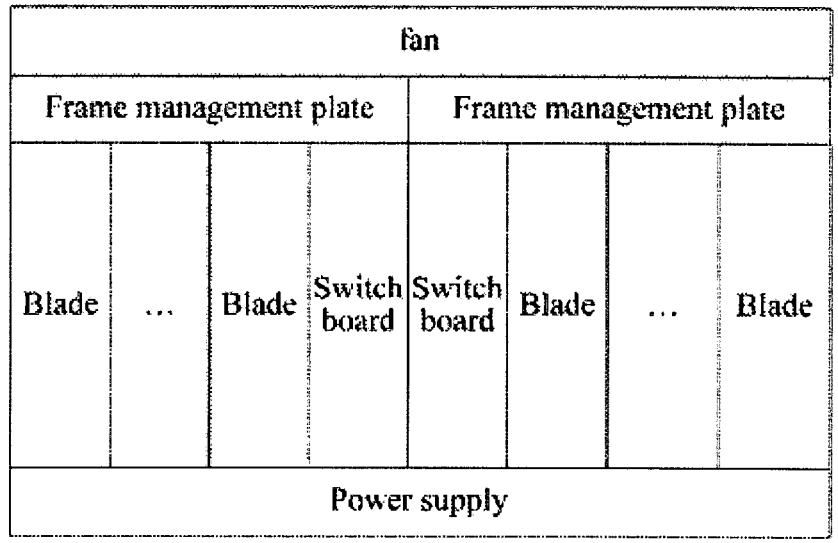
FIG. 1 is a schematic structural diagram of a blade serve in the related art.

In another embodiment of the present invention, the difference between the method and that shown in FIG. 1 is that, step A1 includes setting the running peaks and valleys of a service, and setting the blades selected at the peaks and valleys of the service. Specifically, at the peaks of the service, a blade with high processing capability is distributed to the service; at the valleys of the service, a blade with low processing capability is distributed to the service.

For example, for a voice call service, the time from 08:00 to 24:00 is set as the service peak, and the time from 00:00 to 08:00 is set as the service valley. At the peaks, a blade A with high processing capability is distributed to the logical partition storing the service data, and at the valleys, a blade B with low processing capability is distributed to the logical partition storing the service.

According to the foregoing embodiment, a service at the peaks can be processed by selecting a high-performance blade to ensure that the service is processed normally, but at the valleys, a blade having relatively low performance may be used to release the high-performance blade for processing other services. Compared with the static configuration method between the blades and the services in the related art, the present invention can make a more effective use of the blade resources and reduce the cost of the blade server.

Figure 3:
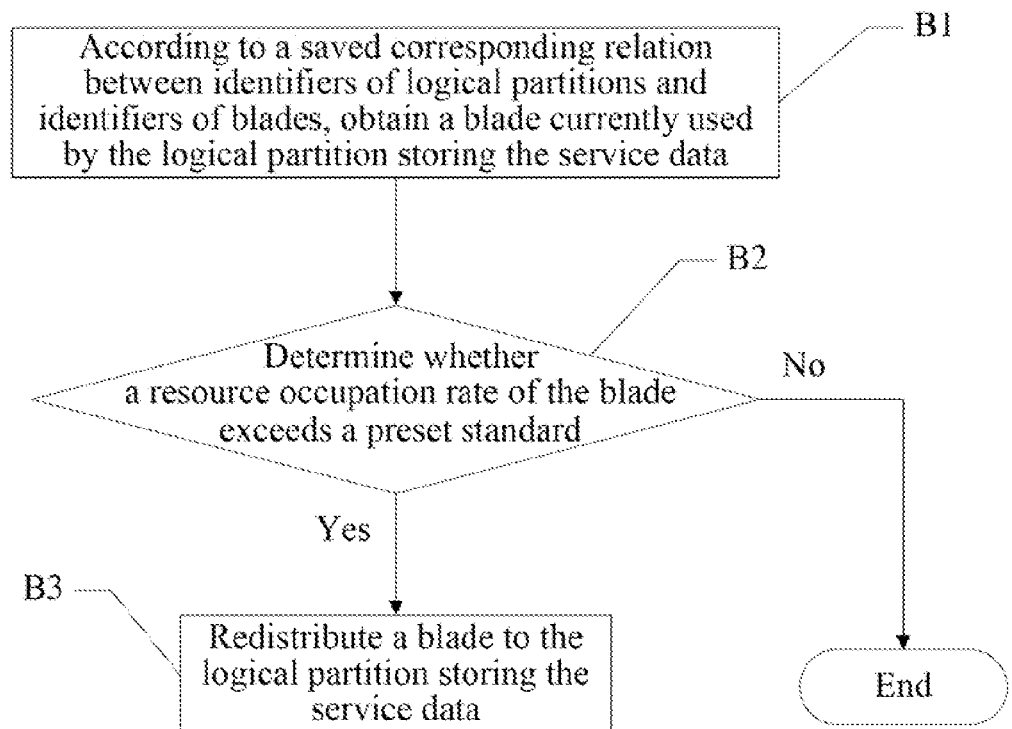
FIG. 3 is a flow chart of a blade selection method according to Embodiment 2 of the present invention.

Another method for selecting a blade is provided, and the flow chart of the blade selection method is shown in FIG. 3. The difference between the method and that shown in FIG. 1 is described in the following, where step A1 includes the following steps.

Step B1: According to a saved corresponding relation between identifiers of the logical partitions and blade identifiers, obtain the blade currently used by the logical partition storing the service data.

The blade identifier is an identifier for uniquely identifying a blade in the system and it may be the World Wide Name (WWN) number of a blade, or an identifier in another format, such as an Input/Output (I/O) interface address of a blade.

According to an embodiment of the present invention, the Storage Area Network (SAN) may be used to store data. By means of the SAN BOOT, the operating system is started from a storage device through the SAN storage network. The operating system is not started from the local hard disk, so the SAN BOOT is sometimes called the REMOTE BOOT.

In the embodiment of the present invention, the corresponding relation between the identifiers of the logical partitions and blade identifiers may be preset, and the blade corresponding to each logical partition can be obtained based on the corresponding relation.

It can be understood that, in the embodiment of the present invention, information related to a service, storage resources information and computing resources information can be pre-stored.

Information related to a service may include service name and type, the operating system in the service, database, service version, configuration data of the service, and storage resources such as the logical partition storing the service data.

Storage resource information may include: LUN distributed to the storage device, Redundant Array of Independent Disk (RAID) level of the defined LUN, and size and name of the logical partition.

Computing resources information may include: Advanced Telecom Computing Architecture (ATCA) frame number, slot number, CPU information (number, speed), memory information (number, size), name, and WWN number.

Step B2: Determine whether a resource occupation rate of the blade exceeds a preset standard, and if the resource occupation rate exceeds the preset standard, continue step B3; if the resource occupation rate does not exceed the preset standard, the flow ends.

In the embodiment of the present invention, requirements of service running for processing capability are different, for example, during the running peaks of the service, service traffic is large, only a high-speed high-performance blade can ensure normal running of the service; but during the running valleys of the service, the requirement for the processing capability of a blade is decreased greatly, and using a high-performance blade to provide services at this time may waste the processing resource. Therefore, in this embodiment, whether the requirement for processing capability of a service is satisfied is identified by determining the resource occupation rate of a blade, where the resource occupation rate may be general parameters such as a CPU occupation rate and memory occupation rate. By determining the resource occupation rate, it can be known whether the processing status of the blade that currently processes the service may satisfy the service requirement.

For example, by obtaining the CPU occupation rate of a blade, it is found that the CPU occupation rate exceeds 97%, so it is deemed that the blade cannot satisfy the service requirement, and the performance of the blade serving the service needs to be improved or another blade needs to be added.

Step B3: Redistribute a blade to the logical partition storing the service data, the processing capability of the redistributed blade is higher than that of the currently used blade; or add another blade to the logical partition storing the service data.

Distributing a blade with higher processing capability to the service can ensure the normal running of the service; of course, the service processing capability may also be improved by adding another blade to process the service.

Of course, a blade server should know the processing capability of the installed blades of the blade server in advance, so as to realize reasonable distribution of blades. For example, data, such as the CPU model, memory size, and bus bandwidth, are pre-stored as a basis for evaluating the processing capability of a blade.

In the foregoing Embodiment 2, the requirement for processing capability of a service is detected, and when a blade corresponding to the service cannot satisfy the service requirement for processing capability, a blade having higher performance is redistributed or another blade for processing the service is added, ensuring the normal running of the service and improving the success ratio and stability of service provision.

Figure 4:
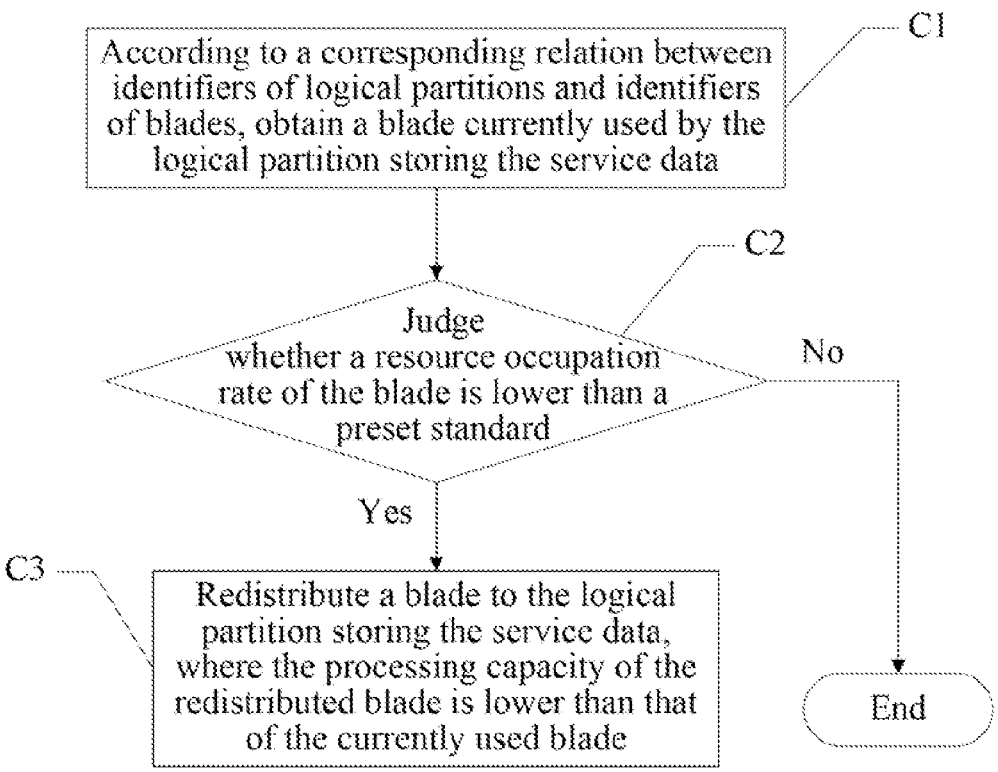
FIG. 4 is a flow chart of a blade selection method according to Embodiment 3 of the present invention.

Another method for selecting a blade is provided, and the flow chart of the blade selection method is as shown in FIG. 4. The difference of this method and the method shown in FIG. 1 is described in the following, where step A1 includes the following steps:

Step C1: According to a corresponding relation between identifiers of the logical partitions and blade identifiers, obtain the blade currently used by the logical partition storing the service data.

Step C2: Determine whether the resource occupation rate of the blade exceeds the preset standard, if the resource occupation rate is lower than the preset standard, perform step C3; if the resource occupation rate does not exceed the preset standard, the flow ends.

Step C3: Redistribute a blade to the logical partition storing the service data, where the processing capability of the redistributed blade is lower than that of the currently used blade.

In this embodiment, when a blade has a low resource rate, a processing method for recycling resources is provided to realize reasonable distribution of resources. For example, when the CPU occupation rate of a blade is lower than 10%, which indicates that the traffic of the blade is low, a blade having lower performance can be selected to process the service without affecting the normal running of the service, at the same time, a blade having higher performance can be released to process a service with a higher requirement for processing capability.

Those skilled in the art should understand that all or part of the steps in the method of the embodiments may be accomplished by relevant hardware under instructions of a program. The program can be stored in a computer readable storage medium including a ROM, a RAM, a magnetic disk, or an optical disk.

Figure 5:
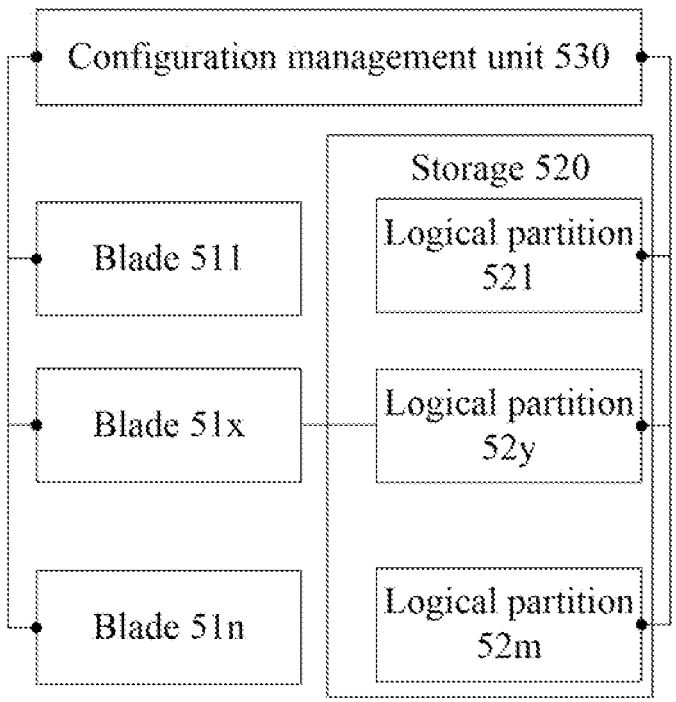
FIG. 5 is a schematic structural diagram of a blade server according to Embodiment 4 of the present invention.

Accordingly, a blade server is provided, the schematic structural diagram of the blade server is shown in FIG. 5. As shown in FIG. 5, the blade server includes blades 511 to 51$n$ (n≧2, and n is an integer) and a storage 520. The storage 520 includes logical partitions 521 to 52$m$ (m≧2, and m is an integer). The blade server further includes a configuration management unit 530.

The configuration management unit 530 is configured to, select a blade 51$x$ (x is an integer within the range from 2 to n) for the logical partition storing the service data according to a requirement for processing capability of a service; and issue an identifier of a logical partition 52$y$ (y is an integer within the range from 2 to m) storing the service data to the selected blade 51$x$.

The blade 51$x$ is further configured to receive the identifier of the logical partition issued by the configuration management unit 530, and start the service from the logical partition 52$y$ corresponding to the identifier of the logical partition.

Figure 6:
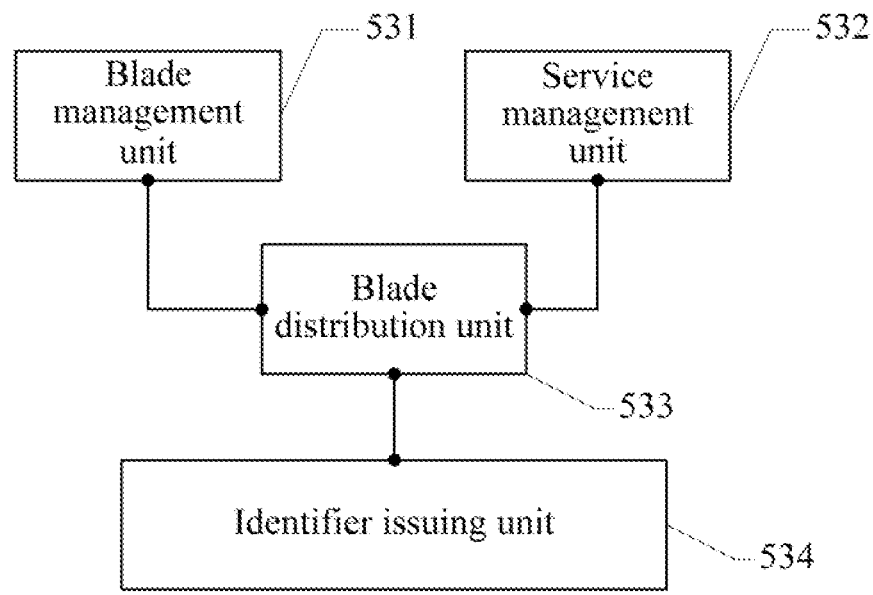
FIG. 6 is a schematic structural diagram of a configuration management unit in a blade server according to an embodiment of the present invention.

In this embodiment, the configuration management unit 530 may include a blade management 531, a service management unit 532, a blade distribution unit 533, and an identifier issuing unit 534, and the schematic structural diagram of the configuration management unit 530 is shown in FIG. 6.

The blade management unit 531 is configured to record an identifier of the new blade and processing capability information of the new blade when a new blade is added.

It can be understood that, the blade management unit 531 may include an acquisition command issuing unit and a blade identifier receiving unit, so as to realize the acquisition of the blade identifier. Specifically:

The acquisition command issuing unit is configured to send a command of acquiring the blade identifier to the blade after the blade is added.

The blade identifier receiving unit is configured to receive the blade identifier returned by the blade and record the blade identifier.

The blade management unit is capable of obtaining processing capability information of the blade according to hardware driver information of a blade or other conventional methods. The capability information may include: the CPU model and memory size of the blade.

The service management unit 532 is configured to record an identifier of a logical partition storing the service data.

The blade distribution unit 533 is configured to obtain from the service management unit 532 the identifier of the logical partition storing the service data, and according to the requirement of a service for processing capability, select a blade for the logical partition storing the service data based on the blade processing capability information recorded by the blade management unit 531.

The identifier issuing unit 534 is configured to issue the identifier of the logical partition storing the service data to the selected blade.

It can be understood that, a blade server provided in Embodiment 4 of the present invention further includes a storage area partition unit and a command management unit.

The storage area partition unit is configured to issue a partition command to the command management unit.

The command management unit is configured to receive the partition command sent by the storage area partition unit 540, convert the partition command into a command line that can be identified by the storage, and issue the command line to the storage 520.

The storage 520 performs the partition of logical partitions according to the command line issued by the command management unit.

For details about a running method of the blade server provided by the embodiments of the present invention, reference may be made to the description in the method embodiments of the present invention, and are not repeated here.

Those skilled in the art should understand that, all or part of processes of the foregoing method in the embodiments may be accomplished by relevant hardware under instructions of a computer program. The program may be stored in a computer-readable storage medium. When the program is executed, the processes of the method according to the embodiments of the present invention may be included. The storage medium may be a magnetic disk, an optical disk, a read-only memory (ROM), or a random access memory (RAM).

The blade server and the service scheduling method of the blade server are described in detail in the embodiments of the present invention. Examples are provided to describe principles and implementations of the present invention, and the preceding embodiments are only used for helping understand the method of the present invention. Meanwhile, those skilled in the art can make modifications and variations on the implementation and application scope of the invention according to the spirit of the present invention. To sum up, the present disclosure should not be construed as limitations to the present invention.

What is claimed is:

1. A service scheduling method of a blade server, comprising:
   selecting, according to a capacity needed for processing a service, a blade for a logical partition that stores service data associated with the service, wherein the blade is selected from a plurality of blades in the blade server;
   issuing an identifier corresponding to the logical partition that stores the service data to the selected blade; and
   enabling the selected blade to start the service from the logical partition corresponding to the identifier,
   wherein selecting the blade for the logical partition comprises:
      obtaining a blade currently used by the logical partition according to a saved correspondence relationship between logical partition identifiers and blade identifiers;
      determining whether a resource occupation rate of the blade currently used by the logical partition is lower than a preset standard or is higher than the preset standard;
      redistributing the logical partition from the blade currently used to a new blade when the resource occupation rate of the blade currently used is lower than the preset standard, wherein a processing capacity of the new blade is lower than a processing capacity of the blade currently used; and
      reassigning a higher-performance blade for the logical partition and/or adding another blade to the logical partition when the resource occupation rate is higher than that of the blade currently used, wherein a processing capacity of the higher-performance blade is higher than that of the blade currently used.

2. The method according to claim 1, wherein selecting the blade for the logical partition further comprises:
   distributing a blade with high processing capability to the logical partition at peaks of the service; and
   distributing a blade with low processing capability to the logical partition at valleys of the service.

3. The method according to claim 1, further comprising updating the saved correspondence relationship between the logical partition identifiers and the blade identifiers after the blade for the logical partition is selected.

4. A blade server, comprising:
   at least two blades;
   a storage; and
   a configuration management unit,
   wherein the storage comprises at least two logical partitions that store service data associated with a service,
   wherein the configuration management unit is configured to select, according to a capacity needed for processing the service, one of the at least two blades of the blade server for one of the at least two logical partitions, and issue an identifier corresponding to the one of the at least two logical partitions to the selected one of the at least two blades,
   wherein the selected one of the at least two blades is configured to receive the identifier issued by the configuration management unit, and start the service from the one of the at least two logical partitions that corresponds to the identifier, and
   wherein the configuration management unit is configured to select the one of the at least two blades by:
      obtaining a blade currently used by the one of the at least two logical partitions according to a saved correspondence relationship between logical partition identifiers and blade identifiers;
      determining whether a resource occupation rate of the blade currently used is lower than or is higher than a preset standard;
      redistributing the logical partition from the blade currently used to the new blade when the resource occupation rate of the blade currently used is lower than the preset standard, wherein a processing capacity of the new blade is lower than a processing capacity of the blade currently used; and
      reassigning a higher-performance blade for the logical partition and/or adding another blade to the logical partition when the resource occupation rate is higher than that of the blade currently used, wherein a processing capacity of the higher-performance blade is higher than that of the blade currently used.

5. The blade server according to claim 4, wherein the configuration management unit comprises:
   a blade management unit configured to record an identifier of the new blade and processing capability information of the new blade when the new blade is added;
   a service management unit configured to record identifiers of the at least two logical partitions that store the service data;
   a blade distribution unit configured to obtain the identifiers from the service management unit, and select the one of the at least two blades according to the capacity needed for processing the service and according to the new blade processing capability information recorded by the blade management unit; and
   an identifier issuing unit configured to issue the identifier corresponding to the one of the at least two logical partitions to the selected blade.

6. The blade server according to claim 5, wherein the blade management unit comprises:
   an acquisition command issuing unit configured to send a command for acquiring a blade identifier to the new blade after the new blade is inserted;
   a blade identifier receiving unit configured to receive the blade identifier returned by the new blade and record the blade identifier;
   a processing information obtaining unit configured to send a command for acquiring processing information to the new blade; and a blade information storage unit configured to store the blade identifier obtained by the blade identifier receiving unit and the new blade processing information obtained by the processing information obtaining unit.

7. The blade server according to claim 4, further comprising:
   a storage area partition unit; and
   a command management unit,
   wherein the storage area partition unit is configured to issue a partition command to the command management unit,
   wherein the command management unit is configured to receive the partition command issued by the storage area partition unit, convert the partition command into a command line that can be identified by the storage, and issue the command line to the storage, and
   wherein the storage performs the partition of logical partitions according to the command line issued by the command management unit.

8. The blade server according to claim 4, wherein the preset standard comprises a preset occupation rate of a central processing unit.

9. The blade server according to claim 4, wherein the configuration management unit is configured to select the one of the at least two blades based at least in part on central processing unit model information and memory size information.

10. The blade server according to claim 4, wherein the capacity needed for processing the service is obtained by automatically collecting statistics about the service.

11. The blade server according to claim 10, wherein the statistics about the service comprise statistics associated with a number of access users and traffic of data transmissions.

12. The blade server according to claim 4, wherein redistributing the logical partition from the blade currently used to the new blade comprises releasing the blade currently used to process a service with a higher processing requirement.

13. The blade server according to claim 4, wherein the blade identifiers comprise World Wide Name (WWN) numbers or Input/Output (I/O) interface addresses.

14. The blade server according to claim 4, wherein the logical partition identifiers comprise a volume label, a logical unit number, a disk array number, or a hard disk interface number.

15. The method according to claim 1, wherein the preset standard comprises a preset occupation rate of a central processing unit.

16. The method according to claim 1, wherein the capacity needed for processing the service is determined based at least in part on use statistics collected for the service.

17. The method according to claim 1, wherein selecting the blade for the logical partition comprises selecting the blade based at least in part on a peak service time interval and a valley service time interval.

18. The method according to claim 1, wherein redistributing the logical partition from the blade currently used to the new blade comprises releasing the blade currently used to process a service with a higher processing requirement.

* * * * *